United States Patent [19]

Masuda

[11] 3,927,916

[45] Dec. 23, 1975

[54] COMBINED LOAD-SENSING PROPORTION AND RELAY VALVE

[75] Inventor: Naosuke Masuda, Higashimatsuyama, Japan

[73] Assignee: Jidosha Kiki Co., Ltd, Tokyo, Japan

[22] Filed: May 31, 1974

[21] Appl. No.: 475,301

[30] Foreign Application Priority Data

June 20, 1973 Japan.............................. 48-69566

[52] U.S. Cl............. 303/22 R; 137/627.5; 303/6 C; 303/40
[51] Int. Cl.$^2$.......................................... B60T 8/18
[58] Field of Search ........ 303/22, 6 C, 40; 188/195; 137/627.5

[56] References Cited
UNITED STATES PATENTS

| | | | |
|---|---|---|---|
| 3,018,139 | 1/1962 | Stelzer........................... | 303/22 A X |
| 3,376,080 | 4/1968 | Kettering et al................ | 188/195 X |
| 3,606,485 | 9/1971 | Scott.............................. | 303/23 R |
| 3,671,086 | 6/1972 | Scott.............................. | 303/23 R |

*Primary Examiner*—George E. A. Halvosa
*Assistant Examiner*—Douglas C. Butler
*Attorney, Agent, or Firm*—Toren, McGeady and Stanger

[57] ABSTRACT

A combined load-sensing proportion and relay valve comprising a valve disk having an exhaust passage in the axial center and held in a normally closed-valve condition, and a control piston assembly for adjustably moving the valve disk to open the valve, characterized in that the control piston assembly consists of three pressure-sensitive pistons, the third piston being formed in one piece with the first piston, the first piston having a downward projection extended from its underside, with the lower end of the projection serving as a valve seat opposite to and engageable with the valve disk, a load spring is disposed between the second and third pressure-sensitive pistons, a regulated-pressure controller consisting of a regulated-pressure exhaust valve held in a normally-open condition and an indicated-pressure feed valve held in a normally closed condition is located with a part of the second pressure-sensitive piston serving as its valve seat, an indicated-pressure chamber is formed above the second piston, and a regulated-pressure chamber is formed between the underside of the second piston and the upper side of the third piston, the regulated-pressure exhaust valve that governs the opening and closing of the indicated-pressure feed valve and the exhausting of the regulated-pressure being located in such a manner that its position is adjustable according to the payload of the vehicle equipped with the relay valve.

4 Claims, 4 Drawing Figures

FIG. 2
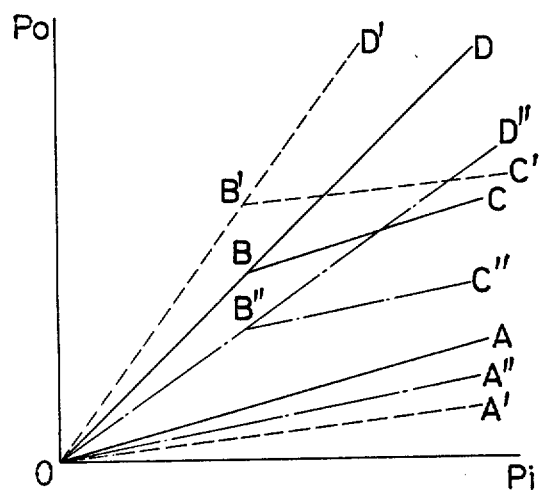
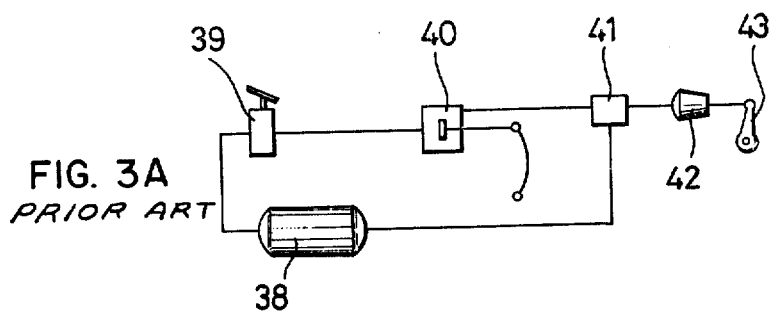
FIG. 3A
PRIOR ART
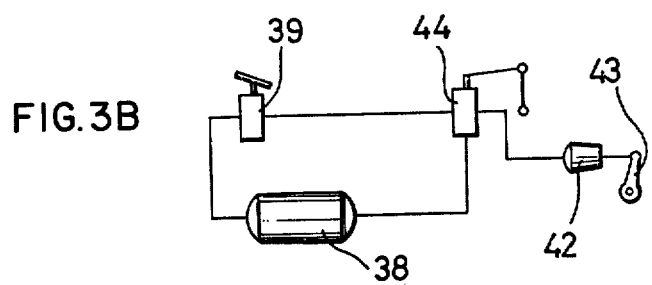
FIG. 3B

COMBINED LOAD-SENSING PROPORTION AND RELAY VALVE

BACKGROUND OF THE INVENTION

This invention relates to a relay valve for the air brake systems to be installed on heavy duty vehicles, such as buses, trucks, tractors and trailers in particular.

Air brake systems on such large vehicles are usually of the type wherein an indicated brake supply pressure from the brake valve depressed open by the operator is conducted to a relay valve and a brake apply pressure proportioned in conformity with the command of the indicated pressure is fed from an air reservoir to brake actuating means via a relay valve. The load the axles of these vehicles carry can vary largely with the loading condition or deceleration by the application of the brake. In view of this, it is important to sense and detect the load in terms, for example, of the distance between the upper and lower ends of a suspension spring or springs and control the indicated pressure from the brake valve according to the value so detected thereby to distribute the braking force suitably between the axles and prevent excessive braking or locking of particular wheels.

In conventional air brake systems, regulating valves generally known as load-sensing proportion valves for performing pressure control according to changes of the vehicle height or of variations in the distance between the upper and lower ends of suspension springs are installed between the brake valves and relay valves so that indicated pressures from the brake valves are regulated before being supplied to the relay valves. Thus, the circuit for the indicated pressure in an ordinary air brake system comprises a brake valve, a load-sensing proportion valve, and a relay valve. The quantity of air to be retained in the line incorporating such components is not small. Since air is a readily compressible medium, the large quantity of air retained in the line leads to a delay in response to the command at the line terminal. Moreover, in an indicated-pressure circuit of the foregoing construction, the differential pressures that are inherently produced between the inlets and outlets of the load-sensing proportion valve and the relay valve are added to each other. This makes it impossible to attain ready and accurate response of the service brake pressure to the command.

SUMMARY OF THE INVENTION

The principal object of the present invention is to provide a relay valve which is quick in response, affords a brake actuator pressure exactly corresponding to the indicated braking pressure in the promixity of the point where the braking is started and also in the region where the indicated braking pressure is relatively low, and produces a suitable braking force for the changing load, so that the above-mentioned disadvantages may be removed.

In attaining the objective of this invention, the combined load-sensing proportion and relay valve according to the invention has the following construction. It comprises a valve disk held in a normally closed-valve condition, and a control piston assembly for adjustably moving the valve disk to open the valve according to the payload or in response to a braking load. The control piston assembly consists of three coaxially arranged pressure-sensitive pistons, the third piston being formed in one piece with the first one. The first pressure-sensitive piston has a downward projection extended from the center of its underside and a valve seat formed at the lower end of the projection for contact, face to face, with a valve seat of the valve disk. The second pressure-sensitive piston is elastically engaged with the first piston via the third piston and a load spring. A regulated-pressure controller consisting of a regulated-pressure exhaust valve kept in a normally-open condition and an indicated-pressure feed valve kept in a normally-closed condition is provided, with a part of the second pressure-sensitive piston serving as its valve seat. An indicated-pressure chamber is formed above the second piston and a regulated-pressure chamber between the underside of the second piston and the upper side of the third piston. The regulated-pressure exhaust valve, which governs the opening and closing of the indicated-pressure feed valve and exhausting of the regulated pressure is located in such a manner that its position is adjustable according to the payload or braking load of the vehicle equipped with the relay valve.

Other objects and advantages of the invention will become more apparent from the following description, when taken in conjunction with the accompanying drawings.

BRIEF DESCRIPTION OF THE DRAWING

FIG. 2 is a graph representing the indicated-pressure to output-pressure characteristics of the relay valve according to the invention;

FIG. 3A is a schematic diagram of an air brake circuit using a conventional relay valve; and FIG. 3B is a schematic diagram of an air brake circuit incorporating a relay valve of the invention.

DESCRIPTION OF THE PREFERRED EMBODIMENT

Figure 1:
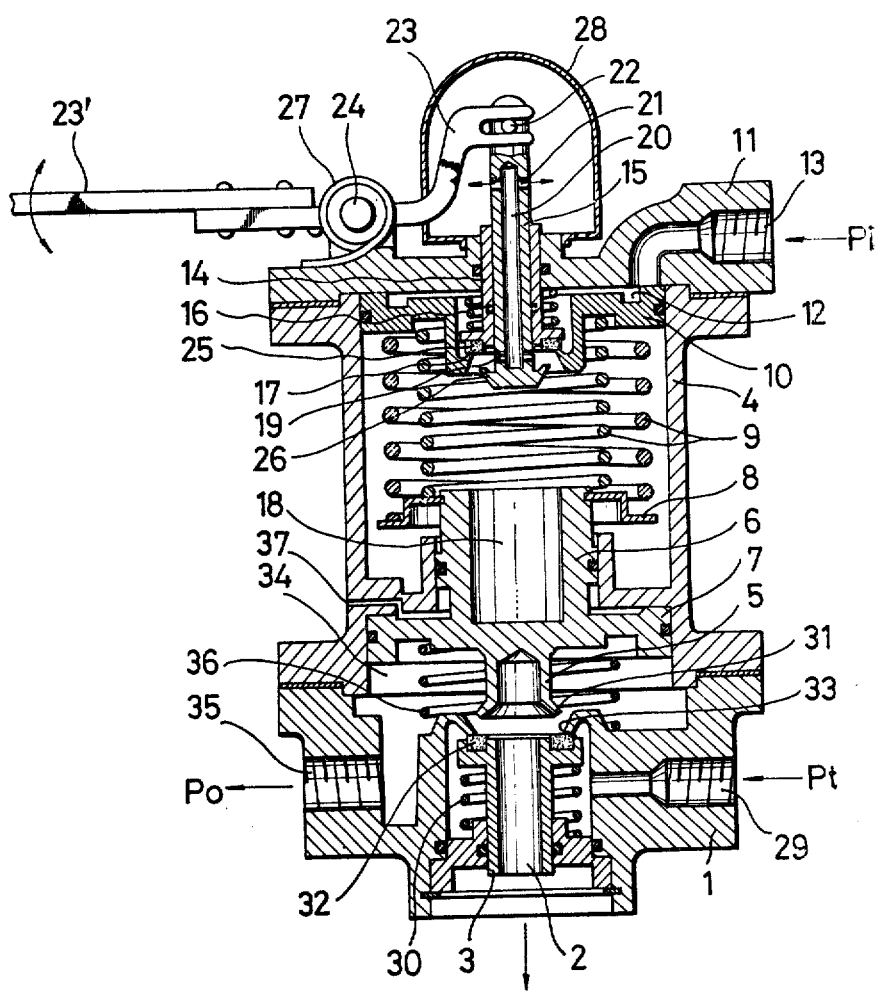
FIG. 1 is a vertical sectional view of a relay valve embodying the present invention.

Referring now to FIG. 1, there is shown a valve body accommodating a valve disk 3 which has an exhaust passage 2 and connected by flanges to a cylinder case 4 thereon. Inside the cylinder case is contained a control piston assembly for adjustably moving the valve disk 3 to open the valve.

The control piston assembly is made up of a first pressure-sensitive piston 7 having a downward projection 5 extending from the center of its underside and also having a third pressure-sensitive piston 6 on its upper side, a spring retainer 8 fitted to the upper end of the third pressure-sensitive piston 6, two load springs 9 seated on the spring retainer, and a second pressure-sensitive piston 10 located on the loading spring 9.

On top of the cylinder case 4 is secured cylinder case cover 11 by flange connections. Between the underside of the case cover 11 and the upper side of the second pressure-sensitive piston 10 is formed an indicated-pressure chamber 12, which is communicated with an indicated-pressure inlet port 13.

A regulated-pressure controller consists of an indicated-pressure feed valve 14 and a regulated-pressure exhaust valve 15 arranged coaxially with each other. The indicated-pressure feed valve 14 is normally urged downward by a spring 16 and is seated on a valve seat 17 formed on the upper surface of the second pressure-sensitive piston 10. The regulated-pressure exhaust valve 15 is normally kept open as shown. A regulated-pressure chamber 18 is communicated with the atmosphere through a small hole 19, an exhaust passage 20, and another small hole 21 of the exhaust valve 15. The valve 15, in turn, is connected through a connection pin 22 at its top to a stroke adjuster 23 and thence through suitable connecting means to the lower end of a suspension spring, for example. Thus, as the lower part of the suspension spring is displaced with a change in load and accordingly the connecting bar 23' of the stroke adjuster is moved up or down, the adjuster 23 turns about a pivot pin 24 with the consequence that the regulated-pressure exhaust valve 15 slides up or down within the indicated-pressure feed valve 14, reproducing the displacement of the suspension spring on a reduced scale.

The second pressure-sensitive piston 10 is designed to move downward, pressing the load springs 9, upon introduction of an indicated pressure P$i$ into the indicated-pressure chamber 12. Elasticity of the spring 16 urges the indicated-pressure feed valve 14 downward, too, until its valve seat 25 contacts the valve seat 26 of the regulated-pressure exhaust valve 15, when the latter valve closes.

With a further descent of the second pressure-sensitive piston 10 while the indicated-pressure feed valve 14 is kept unmovable by the regulated-pressure exhaust valve 15, the valve seat 17 of the second piston is forced away from the valve seat 25 of the feed valve 14, thus permitting inflow of the indicated pressure P$i$ into the regulated-pressure chamber 18.

In order to hold the stroke adjuster 23 while urging the regulated-pressure exhaust valve 15 downward, a coiled leaf spring 27 is fitted round the pivot 24. A dust cover 28 of an elastic material covers the connected parts of the stroke adjuster 23 and the exhaust valve 15.

Numeral 29 designates an inlet port for a braking pressure P$t$. The valve disk 3 is upwardly biased by a spring 30. Numerals 31, 32, and 33 indicated the valve seats, respectively, of the first pressure-sensitive piston 7, valve disk 3, and valve body. An output-pressure chamber 34 is communicated with an output-pressure outlet port. The first pressure-sensitive piston 7 is urged upward by a spring 36. An air vent is indicated at 37.

The operation and performance characteristic of the relay valve according to the present invention, with the construction described above, is as follows.

FIG. 1 shows the relay valve in an inoperative condition. The main valve disk 3 is closed by an air reservoir pressure P$t$ supplied through the inlet port 29 and by the upward urging of the spring 30. If in this state an indicated pressure P$i$ is introduced through the inlet port 13, the second pressure-sensitive piston 10 is forced downward, with the indicated-pressure feed valve 14 resting on the valve seat 17 of the second piston 10. This downward force is completely transmitted to the first pressure-sensitive piston 7 through the load springs 9, spring retainer 8, and third pressure-sensitive piston 6. Consequently, the first piston 7 moves downward against the spring 36, until the valve seat 31 of the downward projection 5 engages the valve seat 32 of the main valve disk 3 to open the valve. This enables the air reservoir pressure P$t$ to flow from the inlet port 29, via the space between the valve seat 32 of the valve disk 3 and the valve seat 33 of the valve body, into the output pressure chamber 34, producing an output pressure P$o$ therein. The output pressure P$o$ acts on the first piston 7 to push the same upward. Thus, unless the regulated-pressure exhaust valve 15 is closed by the indicated-pressure feed valve 14, a working output pressure P$o$ will be obtained in a position where the downward force produced by the indicated pressure P$i$ is balanced with the upward force by the output pressure P$0$. The characteristic of the relay valve according to the invention in this condition is represented by the line O-B in FIG. 2.

Further descent of the second pressure-sensitive piston 10 forces the valve seat 25 of the indicated-pressure feed valve 14 into contact with the valve seat 26 of the indicated-pressure exhaust valve 15 to close the latter valve 15 and then open the former valve 14. Opening the indicated-pressure feed valve 14 admits the indicated-pressure P$i$ into the regulated-pressure chamber 18, developing a regulated-pressure therein. Since the regulated-pressure imparts an upward force to the second piston 10, a working regulated-pressure P$c$ is obtained in the state where the downward force produced by the indicated-pressure is balanced with the upward force by the regulated-pressure. The regulated-pressure P$c$ thus obtained provides a downward force on the third piston 6. This downward force plus the load of the spring 9 is balanced with the upward force provided by the output pressure P$o$ and acting on the first piston 7. The characteristic of the relay valve in the state just described is represented by the line B-C in FIG. 2.

Here if the indicated-pressure P$i$ drops, the balance of the forces acting on the second pressure-sensitive piston 10 will be lost, with the result that the piston will rise to open the regulated-pressure exhaust valve 15. This will release the regulated-pressure into the atmosphere by way of the exhaust valve 15 and the small holes 21. In this manner the drop of the indicated pressure is followed by a corresponding decrease of the regulated pressure.

In this case the regulated-pressure exhaust valve 15 simply bears the downward force that the indicated-pressure feed valve 14 receives because of the indicated-pressure, the stroke adjuster 23 is little influenced and the relay valve of the invention is not unfavorably affected in performance.

On the other hand, when the regulated-pressure exhaust valve 15 is initially kept raised by the stroke adjuster 23, that is, when the indicated-pressure feed valve 14 is open while the regulated-pressure exhaust valve 15 remains closed, the indicated-pressure P$i$ directly enters the regulated-pressure chamber 18, exerting an upward force on the third pressure-sensitive piston 6. The relay valve characteristic in this condition based on the balance of the forces acting on the first piston 7 is indicated by the line O-A in FIG. 2.

The gradient of the line O-B in FIG. 2 depends, in essence, upon the ratio of the output-pressure area of the first pressure-sensitive piston to the indicated-pressure area of the second piston, and it can be freely chosen as represented by O-B' or O-B'', for example. Also, the gradients B-C and O-A in the same figure can be changed as desired to B'-C', B''-C'' or O-A', O-A'' by varying the ratio of the regulated-pressure area of the third piston to the output-pressure area of the first piston. The point B can be displaced not only by changing the location of the regulated-pressure exhaust valve 15 and the indicated-pressure area of the second piston 10 but equally by using a load spring with a different spring constant.

Should any breakdown or damage occur in any member of the linkage connecting the stroke adjuster to a suitable point of a suspension spring or springs, it will be possible to obtain a high output pressure from a low indicated pressure, as represented by the input-output characteristic lines O–D, O–D′, or O–D″ in FIG. 2, by moving the regulated-pressure exhaust valve 15 downward, so as to enhance the braking effect. For this purpose it is advisable, as shown in FIG. 1, to coil the leaf spring 27 round the pivot 24 on the cylinder cover 27 and keep the stroke adjuster 23 turned clockwise or keep the regulated-pressure exhaust valve 15 pulled down.

FIG. 3 gives schematic diagrams of two comparative air brake circuits using a conventional relay valve the relay valve of the invention. In FIG. 3A, which shows the former, the indicated-pressure system is made up of an air reservoir 38, a foot-operated brake valve 39, a load-sensing proportion valve 40, and an ordinary relay valve 41. The brake apply pressure is fed from the air reservoir 38 through the relay valve 41 to a brake actuator 42, turning a slack adjuster 43. In FIG. 3B, which shows the latter, the indicated-pressure system comprises merely an air reservoir 38, a brake valve 39, and a relay valve 44 according to the present invention. The use of the relay valve according to the invention thus renders it possible to simplify the circuitry construction.

As will be obvious from the foregoing description, the incorporation of the relay valve in accordance with the invention not only simplifies the construction of the valve system but also permits attainment of an increased braking efficiency. Since it makes possible the proportioning of braking force best suited for the payload encountered and the load variation on braking, the invention contributes to no small measure to the safe operation of heavy duty vehicles.

What is claimed is:

1. A combined load-sensing proportion and relay valve comprising a valve disk having a central axis with an exhaust passage on the central axis and held in a normally closed-valve condition, and a control piston assembly for adjustably moving the valve disk to open the valve disk, characterized in that the control piston assembly consists of three pressure-sensitive pistons, the third piston being formed in one piece with the first piston, said first piston having a downward projection extended from its underside, with the lower end of the projection serving as a valve seat opposite to and engageable with the valve disk, a load spring is disposed between the second and third pressure-sensitive pistons, a regulated-pressure controller consisting of a regulated-pressure exhaust valve held in a normally-open condition and an indicated-pressure feed valve held in a normally closed condition is located with a part of the second pressure-sensitive piston serving as its valve seat, an indicated-pressure chamber is formed above the second piston, and a regulated-pressure chamber is formed between the underside of the second piston and the upper side of the third piston, said regulated-pressure exhaust valve that governs the opening and closing of the indicated-pressure feed valve and the exhausting of the regulated-pressure being located in such a manner that its position is adjustable according to the payload of the vehicle equipped with the relay valve.

2. A valve as claimed in claim 1 wherein the second pressure-sensitive piston has a pressure-receiving area larger than that of the third piston.

3. A valve as claimed in claim 1 wherein the regulated-pressure exhaust valve of the regulated-pressure controller is connected to a stroke adjuster, which in turn is connected to the lower part of a suspension spring or springs through connecting means.

4. A valve as claimed in claim 3 wherein the stroke adjuster is turnably supported by a pivot pin, and the regulated-pressure exhaust valve is turnably supported by a pivot pin and biased toward the direction where it opens by a spring located round the pivot pin.

* * * * *